United States Patent
Rico et al.

(10) Patent No.: US 9,293,959 B2
(45) Date of Patent: Mar. 22, 2016

(54) APPARATUS TO SUPPORT SUPERCONDUCTING WINDINGS IN A ROTOR OF AN ELECTOMOTIVE MACHINE

(71) Applicants: Raul Ricardo Rico, Oviedo, FL (US); Radek Lekes, Brno (CZ); Tomas Cechak, Prosenice (CZ); Pavel Skacel, Brno (CZ)

(72) Inventors: Raul Ricardo Rico, Oviedo, FL (US); Radek Lekes, Brno (CZ); Tomas Cechak, Prosenice (CZ); Pavel Skacel, Brno (CZ)

(73) Assignee: SIEMENS ENERGY, INC., Orlando, FL (US)

( * ) Notice: Subject to any disclaimer, the term of this patent is extended or adjusted under 35 U.S.C. 154(b) by 549 days.

(21) Appl. No.: 13/748,832

(22) Filed: Jan. 24, 2013

(65) Prior Publication Data
US 2014/0001913 A1   Jan. 2, 2014

Related U.S. Application Data

(60) Provisional application No. 61/666,970, filed on Jul. 2, 2012.

(51) Int. Cl.
| | |
|---|---|
| *H02K 3/46* | (2006.01) |
| *H02K 55/04* | (2006.01) |
| *H02K 5/22* | (2006.01) |
| *H02K 55/00* | (2006.01) |
| *H02K 5/20* | (2006.01) |

(52) U.S. Cl.
CPC .................. *H02K 3/46* (2013.01); *H02K 55/04* (2013.01); *H02K 5/20* (2013.01); *H02K 5/22* (2013.01); *H02K 55/00* (2013.01); *Y02E 40/625* (2013.01)

(58) Field of Classification Search
CPC ............. H02K 3/46; H02K 5/00; H02K 5/12; H02K 5/20; H02K 5/22; H02K 55/00; H02K 5/04
USPC ...................................... 310/89, 91, 194, 214
See application file for complete search history.

(56) References Cited

U.S. PATENT DOCUMENTS

| | | | | |
|---|---|---|---|---|
| 5,532,663 | A * | 7/1996 | Herd et al. ..................... | 335/216 |
| 5,774,032 | A * | 6/1998 | Herd et al. ..................... | 335/216 |
| 6,597,082 | B1 | 7/2003 | Howard et al. | |
| 7,633,192 | B2 | 12/2009 | Zhang et al. | |
| 7,741,738 | B2 | 6/2010 | Ries | |
| 7,795,764 | B2 | 9/2010 | Frank et al. | |
| 7,825,551 | B2 | 11/2010 | Zhang et al. | |
| 8,664,809 | B2 * | 3/2014 | Rico ..................... | H02K 55/04 |
| | | | | 310/194 |
| 2002/0171303 | A1 | 11/2002 | Laskaris et al. | |
| 2002/0171304 | A1 | 11/2002 | Laskaris et al. | |
| 2002/0171318 | A1 | 11/2002 | Wang et al. | |
| 2002/0171325 | A1 | 11/2002 | Wang et al. | |

(Continued)

FOREIGN PATENT DOCUMENTS

EP          0690550 A2      3/1996

*Primary Examiner* — Dang Le
*Assistant Examiner* — Rashad Johnson

(57) ABSTRACT

An apparatus (structure) is provided to support a superconductor winding (61) of an electromotive machine. One or more elongated loops (74) and appropriate support structure (120) may be arranged to provide radial and tangential support to the superconducting winding (61). The elongated loops may be made of a material substantially resistant to heat flow. An axially-extending base assembly (100) may be arranged to anchor loops (74) with respect to the rotor core at a proximate end (76) of the elongated loops. A cradle (80) may be configured to define a recess (82) to receive the superconductor winding and to support the elongated loops at a distal end (78) of the loops.

26 Claims, 7 Drawing Sheets

(56) References Cited

U.S. PATENT DOCUMENTS

| | | |
|---|---|---|
| 2002/0190586 A1 | 12/2002 | Laskaris et al. |
| 2003/0102770 A1 | 6/2003 | Laskaris |
| 2003/0173862 A1 | 9/2003 | Wang et al. |
| 2006/0293189 A1* | 12/2006 | Ries ............................. 505/100 |
| 2008/0079323 A1* | 4/2008 | Zhang et al. .................... 310/52 |
| 2012/0235532 A1* | 9/2012 | Rico ...................... H02K 55/04 310/194 |
| 2013/0300239 A1* | 11/2013 | Rico ....................... H02K 5/00 310/91 |

* cited by examiner

US 9,293,959 B2

APPARATUS TO SUPPORT SUPERCONDUCTING WINDINGS IN A ROTOR OF AN ELECTOMOTIVE MACHINE

This application claims benefit of the 2 Jul. 2012 filing date of U.S. provisional patent application No. 61/666,970.

FIELD OF INVENTION

The invention relates generally to electromotive machines, such as electric generators, motors, and, more particularly, to apparatus (e.g., mechanical structures) arranged to support and thermally isolate superconducting rotor windings in a rotor of the machine.

BACKGROUND OF THE INVENTION

To increase output and efficiency and reduce machine size and weight, superconducting rotor windings with virtually no electrical resistance have been developed. These winding are commonly referred to as high-temperature superconducting (HTS) windings (distinguished from low temperature superconducting materials that achieve a superconducting state at a lower temperature). It is preferred to use high-temperature superconducting materials since their cooling requirements are less severe.

Although the HTS rotor windings (coils) exhibit a relatively low resistance to electrical current flow, they are sensitive to mechanical bending and tensile stresses that can cause premature degradation and winding failure (e.g., an electrically open circuit). For example, it is necessary to form bends in the HTS rotor windings that circumscribe the core. Stresses are induced at these bends. Normal rotor torque, transient fault condition torques and transient magnetic fields induce additional stress forces in the rotor windings. Also, the HTS rotor winding may be subjected to over-speed forces during rotor balancing procedures and occasional over-speed conditions during power generation operation. These overspeed and fault conditions substantially increase force loads on the rotor windings beyond the loads experienced during normal operating conditions. These operating conditions must be considered in the design of the HTS rotor windings and associated support structures.

To maintain the superconducting conductors at or below their critical temperature, coolant flow paths carrying coolant supplied from a cryogenic cooler are disposed adjacent or proximate the windings. Typical coolants may comprise liquid helium, liquid nitrogen or liquid neon. Maintaining the structural integrity of the superconducting rotor windings and associated support structure against static and dynamic loads presents a substantial challenge to the development of a high temperature superconducting electromotive machine.

In view of the foregoing considerations, it is desirable the HTS rotor windings be adequately supported by a winding support system designed to withstand the forces, stresses, strains and cyclical loads of normal and fault condition operation described above. Moreover, the support system should ensure that the windings do not prematurely crack, fatigue or break. It is further desirable that the winding support structure appropriately thermally isolates the "warm" rotor (typically operating above room temperature) from the cryogenically-cooled HTS superconducting windings to maintain the windings at or below their critical temperature.

BRIEF DESCRIPTION OF THE DRAWINGS

The invention is explained in the following description in view of the drawings that show.

DETAILED DESCRIPTION OF THE INVENTION

Figure 1:
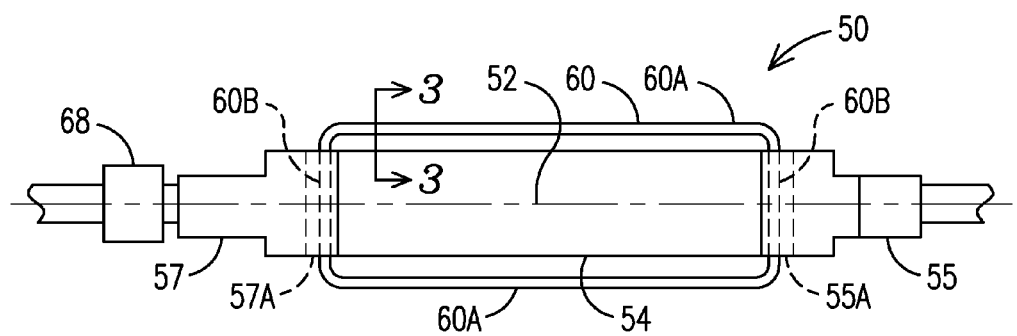
FIG. 1 is a schematic representation of an example rotor, as may be used in a superconducting electromotive machine embodying aspects of the present invention.

A superconducting rotor 50 embodying aspects of the invention is shown in FIG. 1. The superconducting rotor 50 defines a longitudinally-extending axis 52 (e.g., axial direction) and comprises a generally cylindrically-shaped core 54 and coaxially aligned rotor end sections 55 and 57 each attached to an end surface of the core 54. A material of the core 54 exhibits a high magnetic permeability, e.g. a ferromagnetic material such as iron.

In one example embodiment, the superconducting rotor 50 may further comprise a generally longitudinally-extending, racetrack-shaped superconducting coil or winding 60 comprising generally linear axially-extending winding segments 60A connected by radially-extending winding segments 60B (e.g., radial direction), as may extend through respective spacers 55A and 57A disposed at the respective end sections 55 and 57 of rotor 50. It will be appreciated that aspects of the present invention are not limited to racetrack-shaped winding configurations. It will be appreciated that other winding configurations may be employed, such as saddle-shaped configurations, and other configurations which may accommodate multiple windings.

In one example embodiment, superconducting rotor 50 may be arranged as a rotor of an electric generator and superconducting winding 60 may be arranged as an electric generator field (rotor) winding. One of the end sections 55 or 57 may include a turbine coupling for connecting rotor 50 to a prime mover for supplying rotational energy to the superconducting rotor 50 for generating electricity in a stator. In another embodiment, superconducting rotor 50 may be arranged as a rotor of a motor for producing rotational energy responsive to an electric field generated in a surrounding stator winding.

In one example embodiment, end section 57 may include a cryogenic transfer coupling 68. When superconducting rotor 50 is rotating during operation of the dynamoelectric machine, cryogenic transfer coupling 68, which may comprise a stationary portion and a rotating portion (the individual portions not illustrated in FIG. 1), supplies cooling fluid (e.g., cryogenic fluid) from a cryogenic cooler (not shown) to closed coolant flow paths or channels in the superconducting winding 60 to maintain the superconducting winding 60 at or below its critical temperature. The coolant flows through the coolant channels, circulates back to the cryogenic cooler where the coolant temperature is reduced and returns to the coolant channels.

The required cooling capacity of the cryogenic cooler is directly related to the heat transferred from the "warm" rotor core 54 and its surroundings to the superconducting winding 60 during operation of the superconducting generator. The inventors of the present invention propose a winding support structure arranged to substantially reduce such heat transfer during normal and transient operational conditions so that, for example, one can reduce the required cooler capacity and the energy consumed by the cooler to cool the cryogenic fluid.

Figure 2:
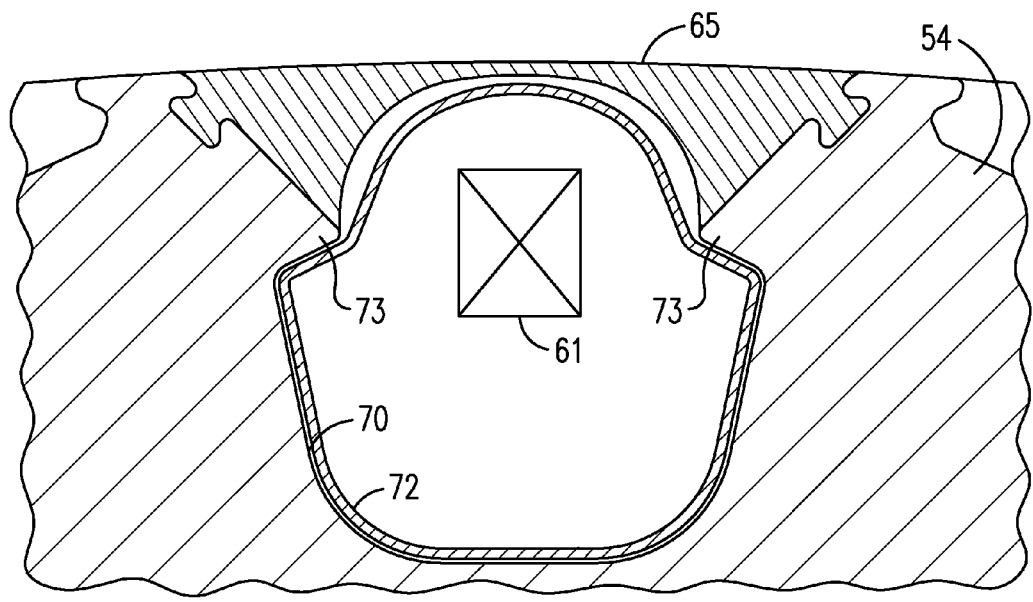
FIG. 2 is a cross-sectional view along a plane 3-3 of FIG. 1.

FIG. 2 is a cross-sectional view along a plane 3-3 of FIG. 1. Because of the various components involved, the figures to be described below will be used for gradually introducing components of an example embodiment of a winding support apparatus embodying aspects of the present invention. The idea is to gradually introduce components that form the winding support apparatus to avoid overwhelming the reader.

FIG. 2 illustrates a cavity 70, as may be constructed in rotor core 54. Cavity 70 may be configured to receive a cryostat 72, as may be used to provide a vacuum to limit radiative heat transfer from rotor core 54 to a superconducting block 61, which in this example embodiment makes up superconducting winding 60. In one example embodiment cryostat 72 may be made from a non-magnetic metal or metal alloy, such as non-magnetic steel.

Cavity 70 may be configured to define appropriately shaped restraining structures, such as shoulders 73, (e.g., protuberances) configured to engage a corresponding surface of cryostat 72 to retain cryostat 72 in cavity 70 under centrifugal forces that develop during rotor operation. Although one superconducting block is illustrated in the FIGs, it will be appreciated that aspects of the present invention are not limited to any specific number of superconducting blocks since other example embodiments may have more than one superconducting block.

Superconducting block 61 (winding) may be made up of a plurality of superconducting tapes formed from a known superconducting HTS material. As would be understood by those skilled in the art, suitable adhesives and techniques may be used to assemble and retain the tapes in a desired configuration. The description below proceeds to introduce example components for mechanically supporting superconducting winding 61 while substantially reducing heat transfer to superconducting winding 61 from the "warm" rotor core 54. FIG. 2 further illustrates an electromagnetic shield 65, which may be connected to rotor 54 to shield superconducting winding 61 from transient electromagnetic fields. Shield 65 may be made from an electrically conductive and non-magnetic material, such as aluminum or copper.

Figure 3:
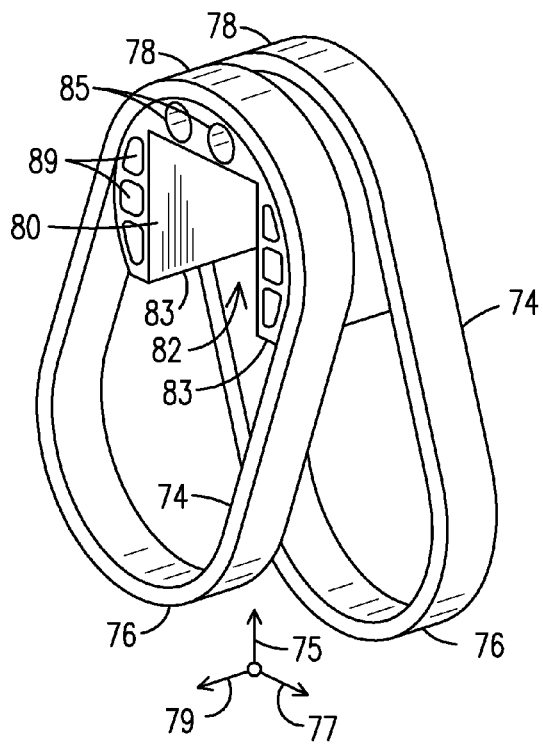
FIG. 3 is an isometric view illustrating an example pair of elongated loops, which may be connected at their respective distal ends to a cradle, and which loops may be arranged to provide both radial and tangential support to the cradle.

FIG. 3 illustrates a pair of elongated loops 74, as may be formed from a material having a relatively high tensile strength at low-temperatures and having high thermal resistivity (e.g., a low thermal conductivity compared to the thermal conductivity of stainless steel), such as a fiber-reinforced polymer (FRP) material. Accordingly, FRP material is one example of a fiber-reinforced composite material substantially resistant to heat flow.

Figure 14:
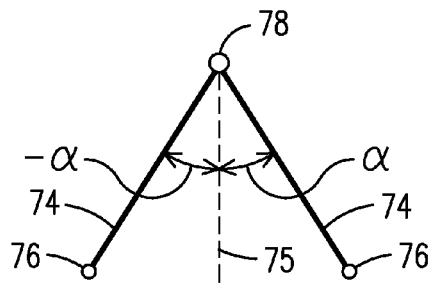
FIG. 14 is simplified free-body diagram for conceptualizing load-carrying aspects provided by the example pair of elongated loops, which in accordance with aspects of the present invention may allow transferring radial and tangential loads while substantially reducing heat transfer from the "warm" rotor core to the superconducting winding.

Each loop 74 may extend at a respective angle (e.g., respective congruent angles, see description related to the free-body diagram discussed in the context of FIG. 14) relative to a radial axis 75 from a proximate end 76 to a distal end 78 to symmetrically provide both radial and tangential support to superconducting winding 61 (not shown in FIG. 3). In this example, distal ends 78 constitute respective radially distal ends relative to rotor axis 52 (FIG. 1). The composite material of loops 74 substantially resists heat flow from the warm rotor core 54 to superconducting winding 61.

As should be appreciated from the description that follows, each loop 74 may be arranged to effectively transfer to the rotor core 54 centrifugal (e.g., as may develop along radial axis 75) and tangential loads (e.g., as may develop along a tangential direction 77, which is orthogonal relative to radial direction 75 and axial direction 79) exerted on superconducting winding 61.

Although the description below, for the sake of simplicity of illustration and explanation, focuses on example pairs of elongated loops, it will be appreciated that aspects of the present invention are not limited to pairs of elongated loops 74. For example, it is contemplated than in lieu of just a singular elongated loop angled at an angle $\alpha$ with respect to radial axis 75 (FIG. 14) and another singular elongated loop angled at an angle $-\alpha$ with respect to radial axis 75, one may utilize a first group of elongated loops $74_1$, $74_2$ (e.g., two or more loops) at respective positive angles $\alpha_1$, $\alpha_2$ with respect to radial axis 75, and a second group of elongated loops $74_1$, $74_2$ at respective negative angles with respect to radial axis 75 $-\alpha_1, -\alpha_2$.

Additionally, although example congruent angles (e.g., $\alpha$, $-\alpha$) are illustrated in the figures, it will be further appreciated that aspects of the present invention are not limited to a symmetrical angular arrangement for the elongated loops. For example, there may be applications where the arrangement of the elongated loops may be asymmetrically chosen either in terms of asymmetrical angles relative to the radial axis and/or in terms of asymmetrical distribution (e.g., a group of two loops on one side of the radial axis and just one loop on the other side of the radial axis) to, for example, enhance the lateral support on the one side relative to the other side (e.g., asymmetrical support). Accordingly, it will be appreciated that aspects of the present invention are not limited to having an equal number of loops per side and/or having a symmetrical angular arrangement for the elongated loops. Moreover, depending on the needs of a given application, one may additionally employ elongated loops along the radial axis in combination with the loops angled with respect to the radial axis 75.

Figure 4:
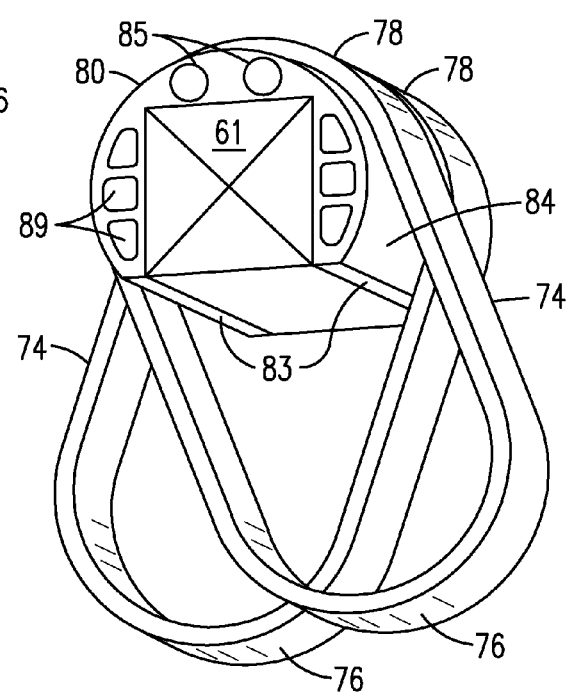
FIG. 4 is an isometric view further illustrating a superconducting winding, which may be disposed in a recess in the cradle.

FIG. 3 further shows an example embodiment of a cradle 80, which includes a recess 82 to receive superconducting winding 61, as shown in FIG. 4. In one example embodiment, cradle 80 may include an arch-shaped exterior surface 84 (better appreciated in FIG. 4), which can receive the respective distal ends 78 of loops 74. Cradle 80 may further include a pair of respective bottom surfaces 83 and may include one or more passageways 85 for passing a suitable cryogen fluid. It will be appreciated by one skilled in the art that aspects of the present invention are not limited to any specific arrangement in connection with passageways 85. For example, it is contemplated that cooling passageways could be constructed within winding 61. In one example embodiment, cradle 80 may include one or more weight-reducing openings 89. Cradle 80 may be made from aluminum, aluminum alloy, or other suitable relatively light-weight, fiber-reinforced composite material. The description below proceeds to introduce further components for mechanically supporting superconducting winding 61 while substantially reducing heat transfer to superconducting winding 61 from the "warm" rotor core 54.

Figure 5:
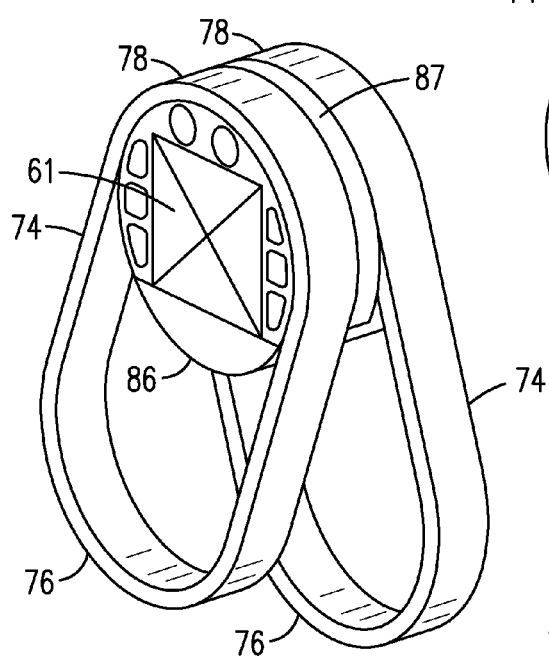
FIG. 5 is an isometric view further illustrating an example pedestal support, which may be arranged to close the bottom of the recess in the cradle, and may provide a surface to support the superconducting winding disposed in the cradle.
Figure 6:
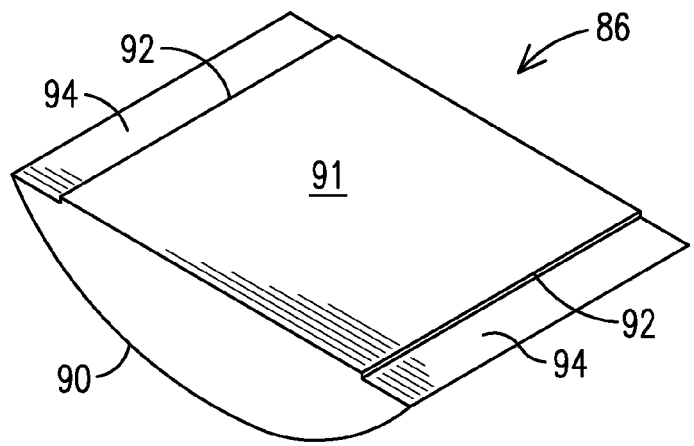
FIG. 6 is an isometric view illustrating example structural details in connection with the pedestal support.
Figure 7:
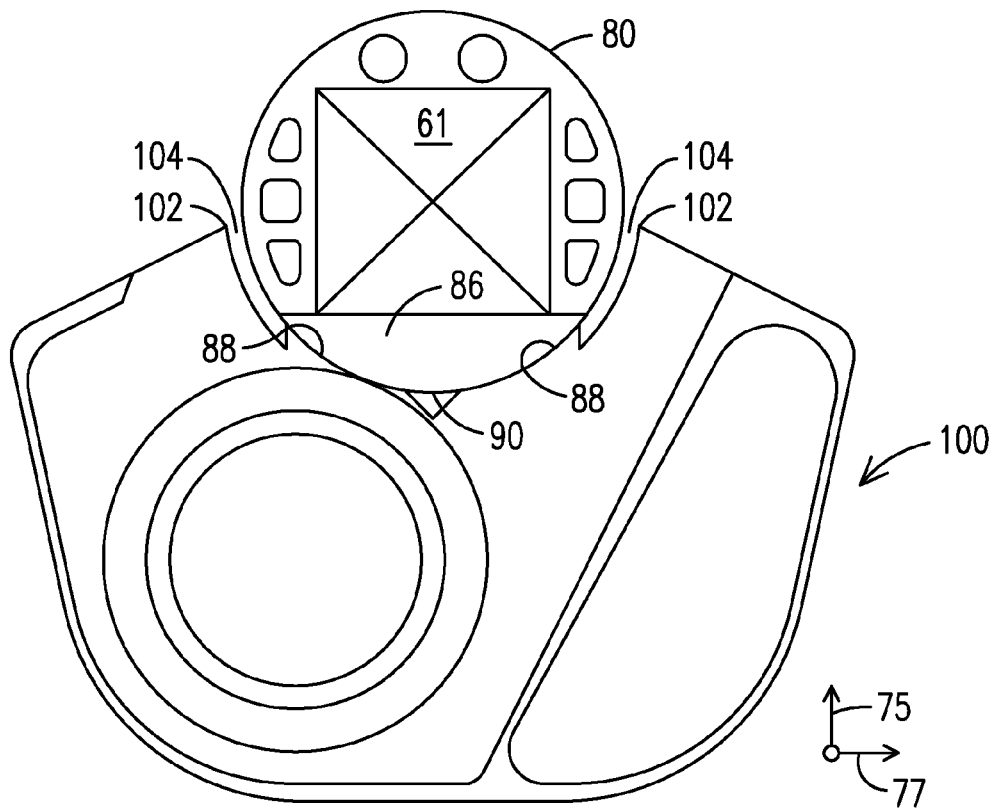
FIG. 7 is an elevational view illustrating an example base assembly, which may be arranged to support during static conditions or relatively low-speed rotor operation the pedestal, and which in one example embodiment may provide a tubular coupling arrangement to anchor the respective proximate ends of the elongated loops.

FIG. 5 shows a pedestal support 86 having a first planar surface 91 (FIG. 6), which closes the bottom of recess 82 (FIG. 3) in cradle 80 and provides a pedestal to support superconducting winding 61. Pedestal 86 may be made from a thermoplastic polymer material or similar thermally-isolating material. Pedestal support 86 further includes a respective pair of steps 92, arranged to define a pair of laterally-disposed planar surfaces 94, which may receive corresponding bottom surfaces 83 (FIG. 4) of cradle 80. Pedestal support 86 may further include an arch-shaped surface 90 (FIG. 6), which in one example embodiment is supported by a base assembly 100 (FIG. 7). It will be appreciated that aspects of the present invention are not limited to any specific geometric configuration in connection with pedestal support 86 since other geometric configurations may work equally effective for pedestal support 86.

Figure 8:
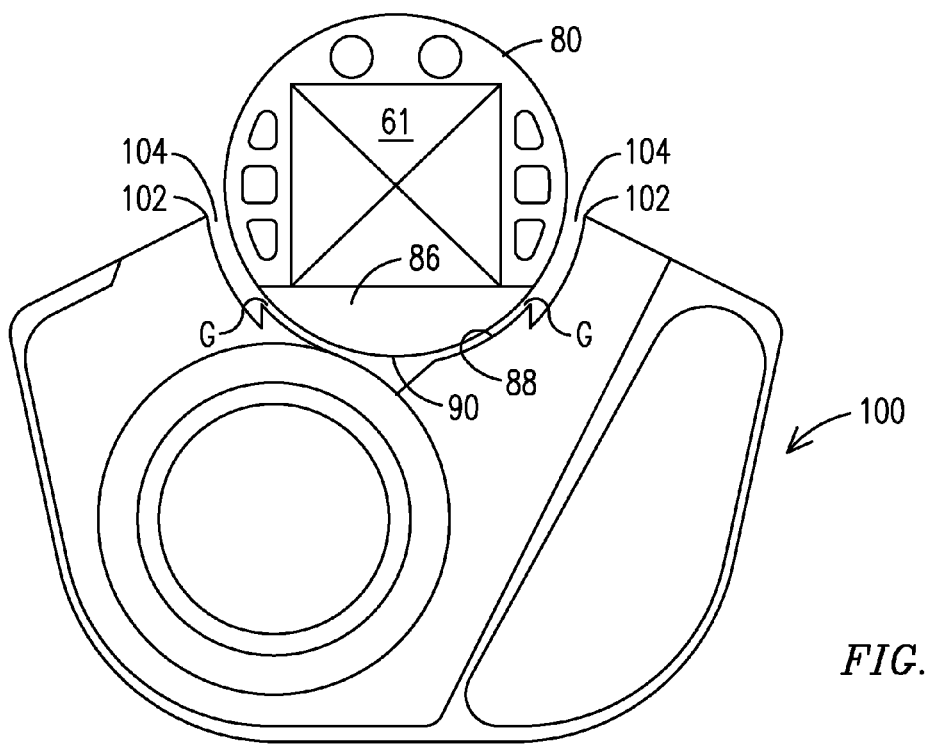
FIG. 8 corresponds to the elevational view of FIG. 7 and further illustrates a gap, which may be formed during normal rotor operation between the base assembly and the pedestal, and which effectively reduces thermal transfer from the rotor to the superconducting winding.

For example, during static conditions (no rotor rotation) or during rotational conditions comprising relatively low revolution per minute (RPM) rotation of the rotor (e.g., in a range from approximately 100 RPM to approximately 300 RPM), pedestal support 86 may be in contact with one or more seats 88, (FIG. 7) which may be constructed along at least one or more portions on a corresponding periphery 102 of base assembly 100. Conversely, during rotational conditions comprising relatively higher revolution per minute (RPM) rotation of the rotor (e.g., approximately exceeding the foregoing example range), in response to centrifugal forces, as illustrated in FIG. 8, a relatively small gap (G) (e.g., in the order of a few millimeters) may be formed between surface 90 of pedestal support 86 and seats 88, and this gap may be effective to reduce conductive thermal transfer from the "warm" rotor core 54 to superconducting winding 61.

It will be appreciated that in one example embodiment respective end-segments 104 of periphery 102 effectively constitute respective mechanical stops to restrain excess lateral motion of cradle 80, which could occur during transient bumping conditions of the machine.

Figure 16:
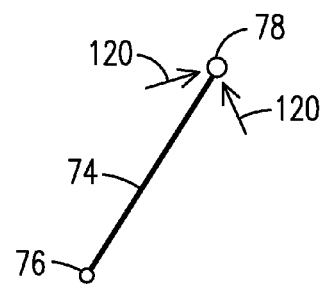
FIG. 16 is simplified free-body diagram for conceptualizing load-carrying aspects regarding still another example embodiment of the present invention, where a single elongated loop in combination with appropriate support structure may allow transferring the radial and tangential loads.
Figure 15:
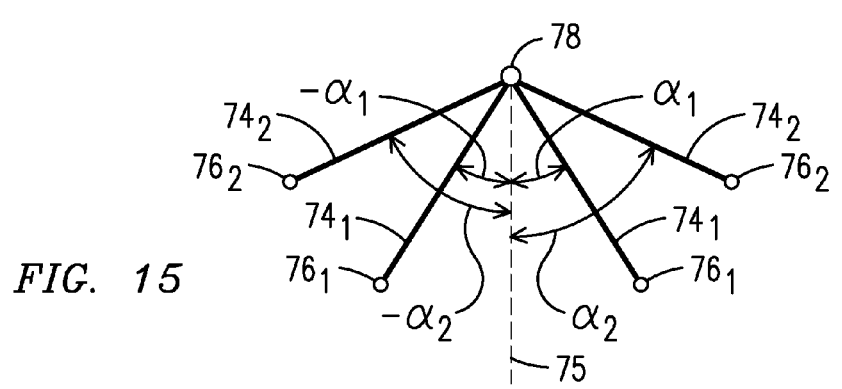
FIG. 15 is simplified free-body diagram for conceptualizing load-carrying aspects regarding another example embodiment of the present invention where groupings of elongated loops (e.g., two or more loops), may allow transferring the radial and tangential loads.

Although the description thus far has referred to pairs or groups of elongated loops 74 disposed to carry centrifugal and tangential loads, it is contemplated that aspects of the present invention could be implemented by way of a single loop 74 and appropriate support structure (other than (and/or in combination with) additional elongated loops), as may be conceptually represented by arrows 120 (FIG. 16), arranged to jointly carry such centrifugal and tangential loads.

Figure 17:
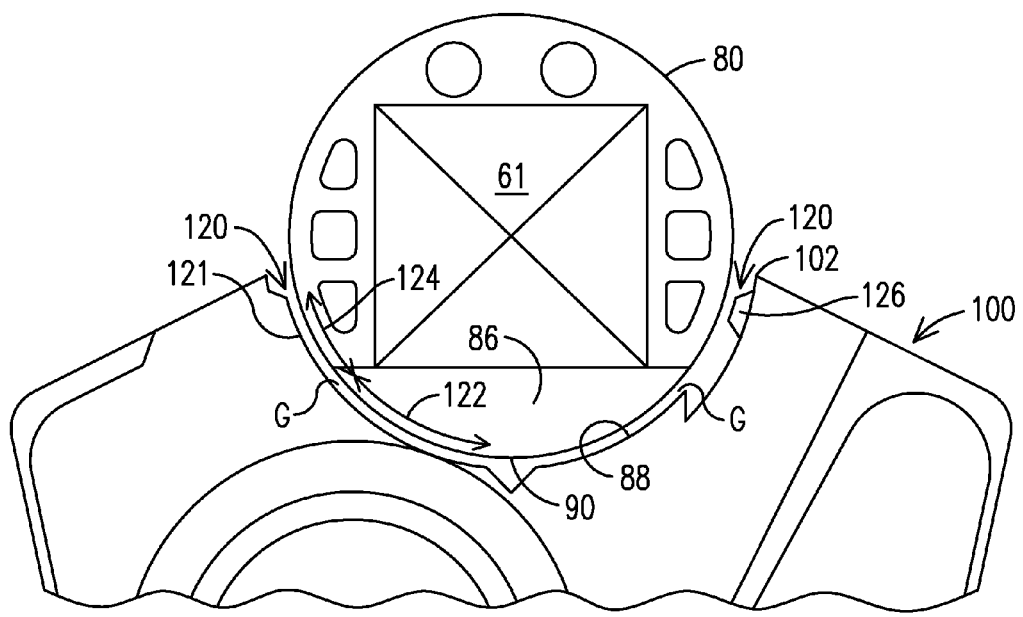
FIG. 17 is an elevational view illustrating an example base assembly, adapted to include appropriate support structure which may be used in conjunction with a single elongated loop to carry the centrifugal and tangential loads.

In one example embodiment, as illustrated in FIG. 17, support structure 120 may comprise one or more bumpers, which may be part of or otherwise constructed on base assembly 100 to provide tangential and/or radial support. Support structure 120 may be implemented in various ways. For example, support structure 120 may be implemented as a continuous bumper 121. This continuous structure would provide a dual functionality. For example, a first bumper portion 122 would provide the support function provided by seat 88 during the static conditions or relatively low-speed rotor operation, and a second bumper portion 124 would provide tangential load and/or radial support, which otherwise would have been carried by a further elongated loop or further group of such loops. In this example embodiment, second bumper portion 124 may be viewed as an extension of seat 88, and bumpers portions 122 and 124 would define at least a portion of periphery 102 of base assembly 100.

In one alternative embodiment, support structure 120 may be implemented as a discrete bumper structure along periphery 102. For example, one or more discrete bumpers 126 would provide the tangential support and/or radial support, which otherwise would have been carried by a further elongated loop or further group of such loops. It will be appreciated that such further elongated loop or groups of elongated loops described above may be broadly conceptualized as example embodiments of support structure 120.

Base assembly 100 may be made from any of various materials, which may comprise a relatively wide range of thermal conductivity characteristics, such as steel, aluminum, aluminum alloy, fiber-reinforced composite material. In example cases where base assembly 100 is made from a material having a relatively high thermal conductivity, support structure 120, for example, may optionally include a coating of an appropriate thermally isolating material, or support structure 120 may be optionally made of a material having lower thermal conductivity relative to the thermal conductivity of base assembly 100. In other example cases, where base assembly 100 is made from a material already comprising a relatively low thermal conductivity (e.g., fiber-reinforced composite), further thermal isolation need not be used in connection with support structure 120.

FIG. 5 further illustrates a spacer 87, which may be mounted on cradle 80 and may be interposed to maintain axial separation between the respective elongated loops 74 to avoid a possibility of mechanical interference between axially-neighboring loops 74. Spacer 87 may be made from aluminum, an aluminum alloy, or other suitable relatively lightweight, fiber-reinforced composite material.

The description thus far provided has focused on example structures for supporting the respective distal ends 78 of elongated loops 74 and associated structures such as cradle 80, etc. The description below will proceed to discuss example structures for supporting the respective proximate ends 76 of elongated loops 74 and associated structures.

Figure 9:
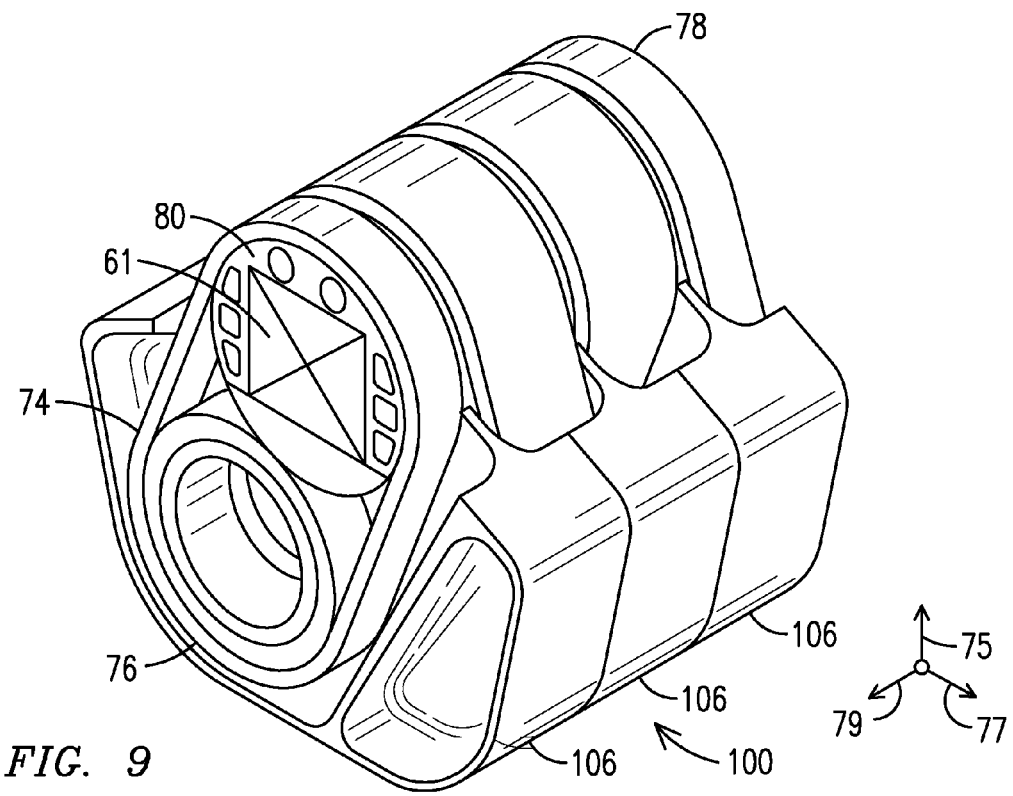
FIG. 9 is an isometric view illustrating a plurality of example base modules, which may be axially interconnected to one another to form the base assembly.

FIG. 9 shows an isometric view of base assembly 100, which in one example embodiment is made up of a plurality of base modules 106 configured to anchor with respect to the rotor core each loop 74 at its respective proximate end 76. In one example embodiment, the plurality of base modules 106 may form an axially-extending anchoring beam, and such modules may be conceptually analogized to Lego-like interlocking building blocks. It will be appreciated that the modular aspects of base assembly 100 are conducive to facilitate the routing of the axially-extending winding segments 60 (FIG. 1) of superconducting winding 61.

Base assembly 100 may be made from any of various materials, such as steel, aluminum, aluminum alloy, fiber-reinforced composite material and may be configured to be enclosed by cryostat 72, where base assembly 100 is retained by shoulders 73 (FIG. 2) together with cryostat 72 in cavity 70 under centrifugal forces that develop during rotor operation. In one example embodiment, cryostat 72 may in part be configured to enclose base assembly 100 and may be further configured to extend outside cavity 70 to form a vacuum about the winding support apparatus and the superconductor winding.

Figure 10:
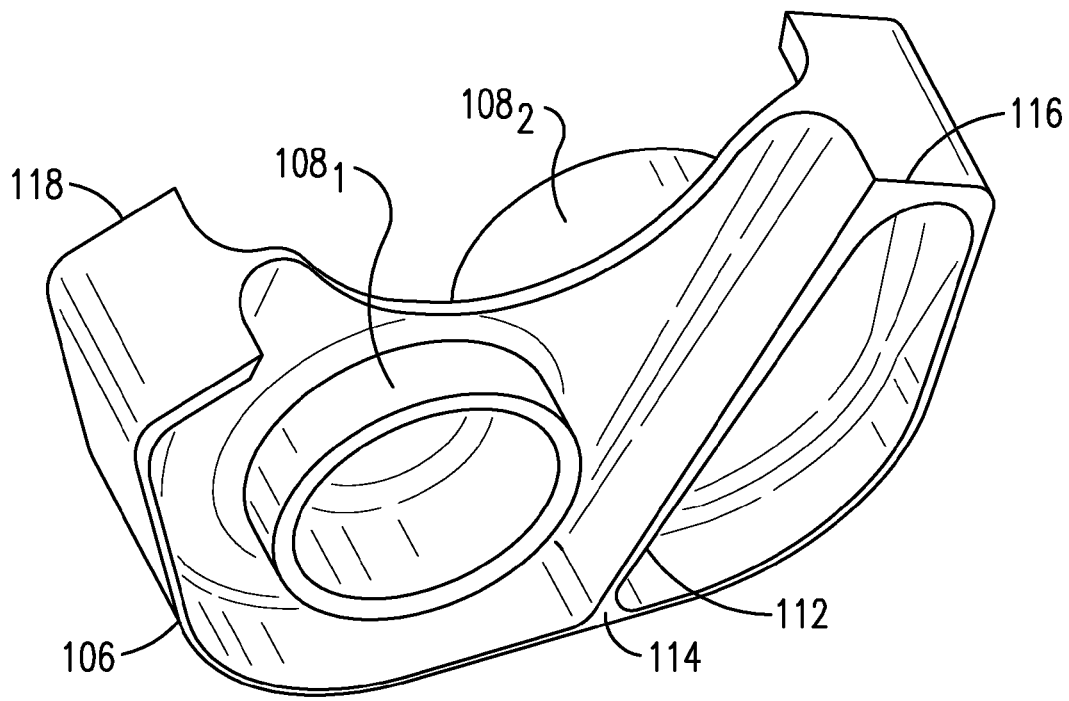
FIG. 10 is an isometric view illustrating example structural details in connection with a base module.

FIG. 10 is an isometric view of an example base module 106, which in combination with additional base modules may form base assembly 100 (FIG. 9). In one example embodiment, each base module 106 may include a tubular coupling arrangement configured to receive the respective proximate ends 76 of loop pair 74 and to provide a mechanical connection (e.g., axial connection) to an adjacent base module.

Figure 11:
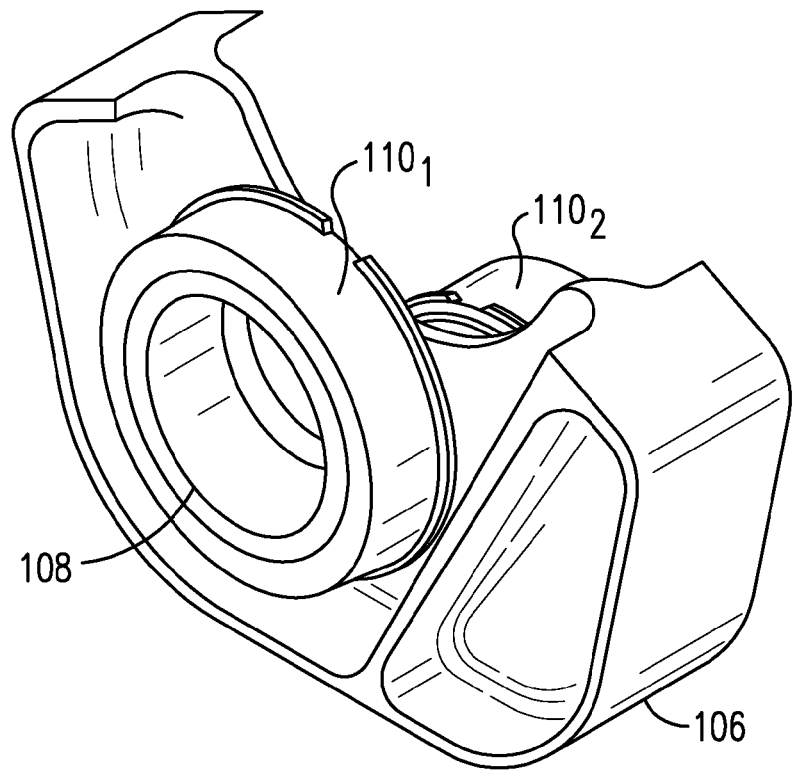
FIG. 11 is an isometric view further illustrating an example pair of female couplers in connection with a tubular coupling, which may be provided by the base module.
Figure 12:
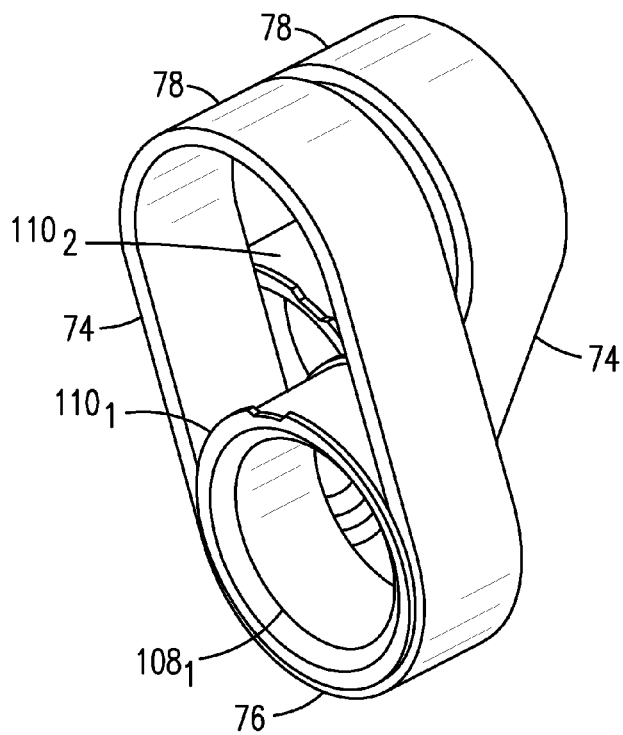
FIG. 12 is an isometric view illustrating a visually-simplified connection arrangement between the respective proximate ends of the elongated loops and the pair of female couplers.

In one example embodiment, each base module 106 may include a pair of male couplers $108_1$, $108_2$ configured to receive at least a portion of respective female couplers $110_1$, $110_2$ (FIG. 11), each of which over a portion of its outer diameter receives the proximate end of a corresponding loop 74, as illustrated in FIG. 12. In one example embodiment, one of the male couplers (e.g., male coupler $108_1$) may be disposed on an axially-forward first side (e.g., left side) of base module 106 and the other one of the male couplers (e.g., male coupler $108_2$) may be disposed on axially-rearward second side (right-side) of base module 106, as may be appreciated in FIG. 10. As can be appreciated in FIG. 10, the interior of male couplers 108 may define respective hollow annuli for weight reduction purposes. It will be appreciated that male couplers 108 need not be hollow structures and in certain example embodiments may be non-hollow structures. This arrangement may be alternatingly repeated by way of additional base modules 106 along the axial direction so that the plurality of base modules 106 forms the axially-extending anchoring beam 100, as shown in FIG. 9.

In one example embodiment, the axial dimension of female couplers 110 may be sufficiently long relative to the axial dimension of male couplers 108 so that the female coupler can also be received by a male coupler of an axially adjacent base module.

In one example embodiment, as may in part be appreciated in FIG. 10, each face of base module 106 may include a pair of diagonal stiffening ribs 112 arranged to structurally stiffen base module 106 relative to bending moments, which may develop by way of the non-centered anchoring arrangement. For example, the stiffening rib shown in the forward face of base module 106 may extend from a bottom center 114 section towards a shoulder 116 located diagonally opposite with respect to male coupler $108_1$, which is located on the left side of the forward face of base module 106. Although not shown in FIG. 10, the rearward face of base assembly would include a similar rib, which in this case would extend from bottom center 114 towards a shoulder 116 located diagonally opposite with respect to male coupler $108_2$, which is located on the right side of the rear face of base module 106. It will be appreciated that aspects of the present invention are not limited to diagonal stiffening ribs or to any number of ribs being that other structural arrangements may be utilized to effectively increase mechanical strength while reducing the weight of the base assembly.

It will be understood that aspects of the present invention are not limited to a segmented tubular coupling arrangement. For example, one could use a continuous tubular coupling arrangement. For example, one or more continuous rods may be used for anchoring each loop 74 at its respective proximate end 76 in lieu of the foregoing segmented coupling arrangement.

It will be further appreciated that aspects of the present invention are not limited to a base assembly structure 100 disposed in a cryostat in a rotor cavity. For example, it is contemplated that, in lieu of base assembly 100 (and associated tubular coupling structures) accommodated in a rotor cavity, one could construct anchoring structures for the distal ends of loops 74, where such anchoring structures are integral with the rotor core of the machine. In this example embodiment, the cryostat may be externally disposed relative to the rotor core, which is a cylindrical structure, and may be attached to and arranged to surround the rotor core 54 to form the vacuum about the winding support apparatus and the superconductor winding.

It will be appreciated that aspects of the present invention are not limited to a sidewardly-alternating sequence of proximate-end connections along the axial direction for the elongated loops in order to transfer tangential and radial loads to the rotor core. For example, one may arrange axially-adjacent (side-by-side) proximate end anchoring connections for the pair of elongated loops so that the respective proximate ends of such loops may be respectively connected to a single face of a given base assembly, in lieu of connecting to both the axially-forward face of base module 106 and to an axially-rearward face of base module 106.

Figure 13:
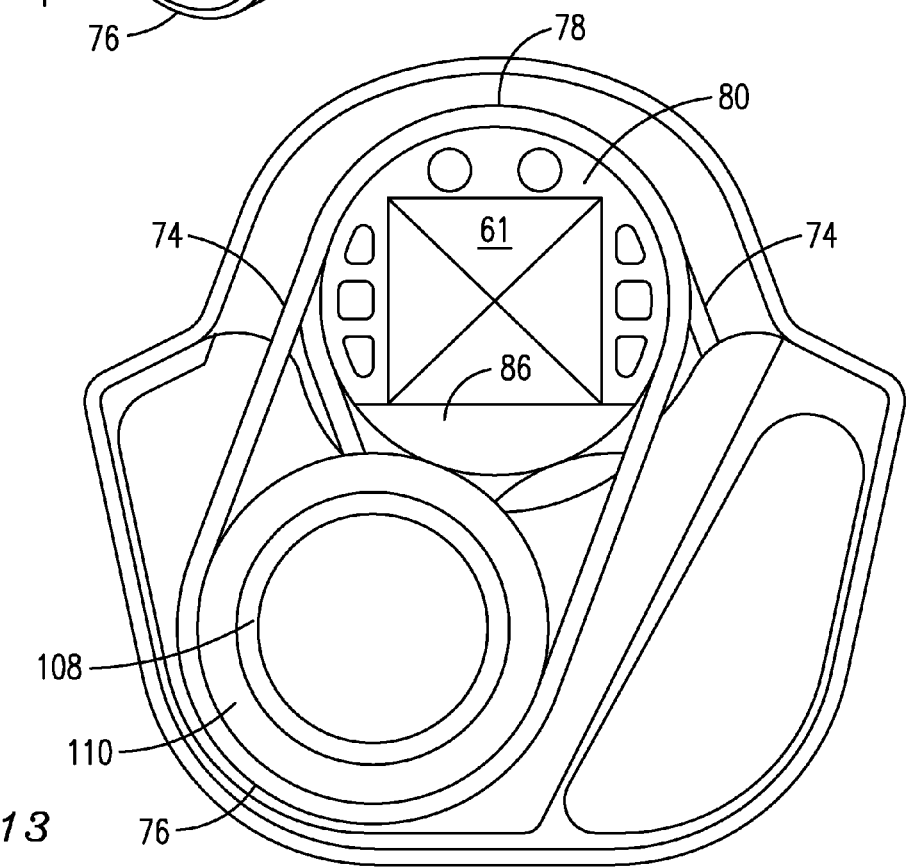
FIG. 13 is an elevational view illustrating an example assembly of at least some of the various components illustrated in some of the preceding FIGs, which in combination form a winding support apparatus embodying aspects of the present invention, such as may be effective to substantially reduce heat transfer from the "warm" rotor core to the superconducting winding while mechanically withstanding forces, stresses, strains and cyclical loads that may develop during normal and/or fault conditions of the machine.

FIG. 13 is an isometric view illustrating an assembly of at least some of the various components described in the preceding description, which in combination form a winding support apparatus embodying aspects of the present invention, such as may be effective to substantially reduce heat transfer from the "warm" rotor core to the superconducting winding while mechanically withstanding forces, stresses, strains and cyclical loads that may develop during normal and fault conditions of the machine.

FIG. 14 is simplified free-body diagram for conceptualizing load-carrying aspects of the elongated loops 74, which allow transferring radial and tangential loads while substantially reducing heat transfer from the "warm" rotor core to the superconducting winding. For example, each loop 74 may be located at an angle α relative to radial axis 75. That is, each loop 74 forms a congruous angle on each side of radial axis 75, which allows loop pair 74 to symmetrically carry vectorial components of the radial and lateral loads, which may develop during operation of the machine. Aspects of the present invention, innovatively and advantageously may simplify the number of components which would be involved, if, for example, one chose to utilize a first assembly dedicated to just carry radial loads and a second assembly dedicated to just carry tangential loads.

While various embodiments of the present invention have been shown and described herein, it will be apparent that such embodiments are provided by way of example only. Numerous variations, changes and substitutions may be made without departing from the invention herein.

The invention claimed is:

1. An apparatus to support a superconductor winding in a spaced apart relationship from a rotor core of an electromotive machine, comprising:
   a cradle configured to define a recess to receive the superconductor winding;
   at least a first elongated loop and at least a second elongated loop each arranged at a respective angle relative to a radial axis to provide radial and tangential support to the cradle, wherein the elongated loops comprise a respective material substantially resistant to heat flow, wherein the cradle is arranged to support said at least first loop and said at least second loop at respective distal ends of the elongated loops, wherein the elongated loops comprise individual structures; and
   an axially-extending base assembly arranged to anchor said at least first loop and said at least second loop with respect to the rotor core at respective proximate ends of the elongated loops, which proximate ends are respectively located on first and second mutually opposite sides of the radial axis.

2. The apparatus of claim 1, wherein the cradle comprises an arch-shaped exterior surface configured to receive the respective distal ends of the elongated loops.

3. The apparatus of claim 1, further comprising a pedestal arranged to close a bottom side of the recess and support the superconducting winding in the cradle.

4. The apparatus of claim 3, wherein the base assembly comprises at least one or more seats arranged to support the pedestal during a static condition of the rotor or during a rotational condition comprising a relatively low revolution per minute (RPM) of the rotor.

5. The apparatus of claim 4, wherein during a rotational condition above the relatively low revolution per minute of the rotor, a gap is formed between said at least one or more seats of the base assembly and the pedestal, thus reducing conductive thermal transfer between the pedestal and the base assembly.

6. The apparatus of claim 1, wherein the axially-extending base assembly comprises a modular assembly comprising a plurality of axially-interconnected base modules disposed in a cavity of the rotor core.

7. The apparatus of claim 6, wherein a base module is arranged to anchor the respective proximate ends of the elongated loops with respect to the rotor core by way of a tubular coupling.

8. The apparatus of claim 7, wherein the tubular coupling is further arranged to provide an axial mechanical connection with respect to an axially-adjacent base module.

9. The apparatus of claim 7, wherein the tubular coupling comprises a segmented tubular coupling interconnectable by way of respective couplers.

10. The apparatus of claim 1, wherein the respective angles relative to the radial axis of said at least first loop and said at least second loop comprise congruent angles to provide symmetrical tangential support to the cradle.

11. The apparatus of claim 1, wherein said at least first elongated loop and one or more further loops form a first group of elongated loops having proximate ends respectively located on the first side of the radial axis, and said at least second elongated loop and one or more further loops form a second group of elongated loops having proximate ends respectively located on the second side of the radial axis.

12. The apparatus of claim 11, wherein the first and second groups of elongated loops comprise an equal number of loops.

13. The apparatus of claim 1, further comprising at least one spacer disposed about a portion of the cradle and interposed between the respective distal ends of the elongated loops to maintain axial separation between the elongated loops.

14. An apparatus to support a superconductor winding in a spaced apart relationship from a rotor core of an electromotive machine, comprising:
   a cradle configured to define a recess to receive the superconductor winding;
   at least a first elongated loop and at least a second elongated loop each arranged at a respective angle relative to a radial axis to provide radial and tangential support to the cradle, wherein the elongated loops comprise a respective material substantially resistant to heat flow, wherein the cradle is arranged to support said at least first loop and said at least second loop at respective distal ends of the elongated loops; and
   an axially-extending base assembly arranged to anchor said at least first loop and said at least second loop with respect to the rotor core at respective proximate ends of the elongated loops, which proximate ends are respectively located on first and second mutually opposite sides of the radial axis, wherein the axially-extending base assembly comprises a modular assembly comprising a plurality of axially-interconnected base modules disposed in a cavity of the rotor core, wherein a base module comprises an axially-forward face and an axially-rearward face, wherein the tubular coupling comprises at least a first tube located at the axially-forward face of said at least one base module and further located at the first of the mutually opposite sides to receive the proximate end of said at least first of the elongated loops, wherein the tubular coupling further comprises at least a second tube located at the axially-rearward face of said at least one base module and further located at the second of the mutually opposite sides to receive the proximate end of said at least second of the elongated loops.

15. An apparatus to support a superconductor winding in a spaced apart relationship from a rotor core of an electromotive machine, comprising:
   a cradle configured to define a recess to receive the superconductor winding;
   at least a first elongated loop and at least a second elongated loop each arranged at a respective angle relative to a radial axis to provide radial and tangential support to the cradle, wherein the elongated loops comprise a respective material substantially resistant to heat flow, wherein the cradle is arranged to support said at least first loop and said at least second loop at respective distal ends of the elongated loops; and
   an axially-extending base assembly arranged to anchor said at least first loop and said at least second loop with respect to the rotor core at respective proximate ends of the elongated loops, which proximate ends are respectively located on first and second mutually opposite sides of the radial axis, wherein the respective angles relative to the radial axis of said at least first loop and said at least second loop comprise different angles to provide asymmetrical tangential support to the cradle.

16. An apparatus to support a superconductor winding in a spaced apart relationship from a rotor core of an electromotive machine, comprising:
- a cradle configured to define a recess to receive the superconductor winding;
- at least a first elongated loop and at least a second elongated loop each arranged at a respective angle relative to a radial axis to provide radial and tangential support to the cradle, wherein the elongated loops comprise a respective material substantially resistant to heat flow, wherein the cradle is arranged to support said at least first loop and said at least second loop at respective distal ends of the elongated loops; and
- an axially-extending base assembly arranged to anchor said at least first loop and said at least second loop with respect to the rotor core at respective proximate ends of the elongated loops, which proximate ends are respectively located on first and second mutually opposite sides of the radial axis, wherein said at least first elongated loop and one or more further loops form a first group of elongated loops having proximate ends respectively located on the first side of the radial axis, and said at least second elongated loop and one or more further loops form a second group of elongated loops having proximate ends respectively located on the second side of the radial axis, wherein the first and second groups of elongated loops comprise a different number of loops.

17. An apparatus to support a superconductor winding in a spaced apart relationship from a rotor core of an electromotive machine, comprising:
- a cradle configured to define a recess to receive the superconductor winding;
- at least a first elongated loop arranged at a respective angle relative to a radial axis, wherein said at least first elongated loop comprises a respective material substantially resistant to heat flow, wherein the cradle is arranged to support said at least first loop at a distal end of the elongated loop, wherein said at least first loop comprises an individual structure;
- an axially-extending base assembly arranged to anchor said at least first loop with respect to the rotor core at a proximate end of the elongated loop, which proximate end is located on a first side of the radial axis; and
- a support structure to provide jointly with said at least first loop radial and tangential support to the cradle.

18. The apparatus of claim 17, wherein the support structure comprises at least a second elongated loop comprising a respective material substantially resistant to heat flow, wherein the cradle is arranged to support said at least second loop at a respective distal end of said at least second elongated loop, wherein the base assembly is arranged to anchor said at least second loop with respect to the rotor core at a respective proximate end of said at least second loop, wherein the proximate end of said at least second loop is located on a second side of the radial axis, which is opposite to the first side.

19. The apparatus of claim 17, wherein the base assembly comprises a bumper support structure which constitutes the support structure.

20. The apparatus of claim 19, wherein the bumper support structure comprises at least one discrete bumper disposed on a periphery of the base assembly.

21. The apparatus of claim 17, further comprising a pedestal arranged to close a bottom side of the recess and support the superconducting winding in the cradle.

22. The apparatus of claim 21, wherein the base assembly comprises at least one seat arranged to support the pedestal during a static condition of the rotor or during a rotational condition comprising a relatively low revolution per minute (RPM) of the rotor.

23. The apparatus of claim 22, wherein the support structure comprises an extension of said at least one seat.

24. The apparatus of claim 23, wherein said at least one seat and the extension of said at least one seat form a continuous bumper support structure, which defines at least a portion of the periphery of the base assembly.

25. The apparatus of claim 21, wherein the bumper support structure comprises a first bumper portion which defines a seat arranged to support the cradle during a static condition of the rotor or during a rotational condition comprising a relatively low revolution per minute (RPM) of the rotor, and further comprising a second bumper portion which jointly with said at least first loop provide the radial and tangential support to the cradle.

26. An apparatus to support a superconductor winding in a spaced apart relationship from a rotor core of an electromotive machine, comprising:
- at least a first elongated loop arranged at a respective angle relative to a radial axis, the elongated loop comprising a respective material substantially resistant to heat flow, wherein said at least first loop comprises an individual structure;
- a support structure to provide jointly with said at least first loop radial and tangential support to the winding;
- an axially-extending base assembly arranged to anchor said at least first loop with respect to the rotor core at a proximate end of the elongated loop, which proximate end is located on a first side of the radial axis; and
- an assembly to receive the superconductor winding and to support said at least first loop at a respective distal end of the elongated loop.

* * * * *